(12) United States Patent
Ingendoh

(10) Patent No.: US 12,467,015 B2
(45) Date of Patent: Nov. 11, 2025

(54) METHOD OF MAKING FATTY ACID ESTERS

(71) Applicant: REC Reliable Engineering Concepts GmbH, Stuttgart (DE)

(72) Inventor: Axel Ingendoh, Odenthal (DE)

(73) Assignee: REC Reliable Engineering Concepts GmbH, Stuttgart (DE)

( * ) Notice: Subject to any disclaimer, the term of this patent is extended or adjusted under 35 U.S.C. 154(b) by 765 days.

(21) Appl. No.: 17/756,361

(22) PCT Filed: Nov. 26, 2020

(86) PCT No.: PCT/EP2020/083546
§ 371 (c)(1),
(2) Date: May 23, 2022

(87) PCT Pub. No.: WO2021/105305
PCT Pub. Date: Jun. 3, 2021

(65) Prior Publication Data
US 2023/0348815 A1 Nov. 2, 2023

(30) Foreign Application Priority Data

Nov. 26, 2019 (EP) ................................. 19211549
Nov. 26, 2019 (ID) ........................... P00201910918

(51) Int. Cl.
*C11C 3/10* (2006.01)
*C11C 3/00* (2006.01)

(52) U.S. Cl.
CPC ................ *C11C 3/10* (2013.01); *C11C 3/003* (2013.01)

(58) Field of Classification Search
CPC ........... C11C 3/003; C11C 3/10; C07C 67/02; C07C 67/03
See application file for complete search history.

(56) References Cited

U.S. PATENT DOCUMENTS

| | | | | |
|---|---|---|---|---|
| 2008/0015375 A1* | 1/2008 | Banavali | ................. | C07C 67/03 554/174 |
| 2008/0250700 A1* | 10/2008 | Tremblay | ............... | C10L 1/026 422/187 |
| 2015/0267145 A1 | 9/2015 | Pottathil | | |

FOREIGN PATENT DOCUMENTS

| | | | | |
|---|---|---|---|---|
| DE | 102018004940 A1 | 1/2019 | | |
| JP | 5454835 B2 * | 3/2014 | ............. | C07C 76/03 |
| WO | 2011018228 A1 | 2/2011 | | |

OTHER PUBLICATIONS

Zhang, Y., et al., Biodiesel production from waste cooking oil: 1. Process design and technological assessment, Bioresource Technology, 89, pp. 1-16 (Year: 2003).*
International Search Report and Written Opinion dated Feb. 23, 2021 for PCT/EP2020/083546.
Energy Conversion and Management, 174, 2018, 639-648.

* cited by examiner

*Primary Examiner* — Yate' K Cutliff
(74) *Attorney, Agent, or Firm* — Dorsey & Whitney LLP

(57) ABSTRACT

Method of transesterifying a fatty acid triglyceride with a $C_{1-30}$ aliphatic alcohol, the method comprising step (A): (A) heating the fatty acid triglyceride with the $C_{1-30}$ aliphatic alcohol in the presence of an acid; wherein the acid is selected from the group consisting of a sulfonic acid, a disulfonic acid and a hydroxycarboxylic acid, and a mixture thereof; the molar ratio of fatty acid triglyceride to aliphatic alcohol is less than 1:6; and the heating in step (A) is in a temperature range of from 20 to less than 100° C.

14 Claims, No Drawings

METHOD OF MAKING FATTY ACID ESTERS

RELATED APPLICATIONS

This application is a Section 371 national phase filing of PCT Application No. PCT/EP2020/083546, filed on Nov. 26, 2020, and titled METHOD OF MAKING FATTY ACID ESTERS, which claims priority to European Patent Application No. 19211549.1, filed on Nov. 26, 2019, and Indonesian Patent Application No. P00201910918, filed Nov. 26, 2019, each of which is incorporated herein by reference in its entirety.

FIELD OF THE INVENTION

The invention is in the field of making fatty acid esters. The esters may be used as biodiesel or waxes.

BACKGROUND OF THE INVENTION

Biodiesel is renewable fuel produced from fats and oils by transesterification with predominantly methanol. Not least due to increasing environmental impacts, methods of making biodiesel are subject of a comprehensive and still growing research.

One standard production route is the transesterification of triglycerides with methanol under basic conditions. However, since disadvantageous soap formation may occur due to free fatty acids contained in said triglycerides, acid-catalyzed transesterification has attracted interest since it avoids same.

EP 2 464 715 B1 suggests a transesterification of a natural oil with methanol or ethanol in the presence of methanesulfonic acid at a temperature of from 100° C. and 120° C. under pressure.

DE 10 2018 004 940 discloses a continuous transesterification process of triglycerides using an alcohol, preferably methanol or ethanol, in a two- to fivefold molar excess under the influence of aliphatic sulfonic acids. The reaction is carried out in a temperature range of from 64 to 145° C. and at pressure. This continuous process may require a complex apparatus system such as a cascade of reaction and regeneration vessels.

Energy Conversion and Management, 174 (2018), 639-648, discloses that sulfuric acid may catalyze the transesterification of soybean oil at atmospheric pressure and relatively medium temperature range. E.g., the use of concentrated sulfuric acid in the reaction of soybean oil with nine times methanol stoichiometry resulted in 99% conversion at 100° C. reaction temperature. A mixture of 50% sunflower oil and 50% soybean oil could be transesterified with a 6:1 molar ratio of methanol to oil, 60° C. reaction temperature and 2.5 wt. % of sulfuric acid as catalyst. It is known that sulfuric acid may be strongly corrosive. Furthermore, sulfuric acid may be sulfonating and dehydrating under the reaction conditions and may degrade the used triglyceride. This hampers the usability thereof in the manufacture of biodiesel at an industrial scale.

US 2008/250700 A1 discloses an apparatus for the production of a biofuel or a biofuel additive from plant-derived oils, animal fats or a mixture thereof, suitable for use in a diesel engine. The apparatus comprises a porous membrane for separating a reaction mixture from a permeate, the reaction mixture comprising an alcohol, a feedstock comprising plant-derived oils, animal fats or mixture thereof, and a catalyst for converting said feedstock to a biofuel or a biofuel additive, wherein said porous membrane is substantially impermeable to the feedstock and substantially permeable to said biofuel or biofuel additive. A method using said porous membrane in the production of a biofuel or a bio-fuel additive is also disclosed.

US 2008/015375 A1 discloses a method for transesterification of triglycerides, especially those containing free fatty acids, with methanol. The method uses a catalyst derived from an acidic ion exchange resin. The catalyst is contacted with a reaction mixture containing a triglyceride and methanol under conditions suitable for transesterification.

OBJECTS OF THE INVENTION

Despite these advances, there is an ongoing need in the art for developing beneficial processes for making biodiesel at an industrial scale.

SUMMARY OF THE INVENTION

This object was achieved with a method of transesterifying a fatty acid triglyceride with a $C_{1-30}$ aliphatic alcohol, the method comprising step (A):

(A) heating the fatty acid triglyceride with the $C_{1-30}$ aliphatic alcohol in the presence of an acid;

wherein the acid is selected from the group consisting of a sulfonic acid, a disulfonic acid, a hydroxycarboxylic acid, and a mixture thereof;

the molar ratio of fatty acid triglyceride to aliphatic alcohol is less than 1:6; and the heating in step (A) is in a temperature range of from 20° C. to less than 100° C.

The new process allows for making $C_{1-30}$ aliphatic fatty acid esters under mild conditions in terms of temperature in high yield and in simple apparatuses such as stirred tanks.

The process is advantageously carried out at temperatures below 100° C.

The reaction is preferably carried out unpressurized.

However, as a matter of course, the reaction may also be carried out under pressure, if desired.

The used acids are less corrosive than sulfuric acid and do not result in noteworthy degradation of the triglyceride.

Despite the advances and comprehensive research in the art, the process as disclosed herein provides for a simple and advantageous method which has not been recognized in the art until now. The method is of particular interest in view of industrial applicability.

Advantageously, in the process according to the invention, the alcohol may not only be restricted to short-chain alcohols used in biodiesel production, but also long-chain alcohols can be used resulting in ester having wax properties.

The process advantageously delivers fatty acid esters with very low content of fatty acid monoglycerides. This is beneficial when using said fatty esters as biofuel for transportation and heating.

Surprisingly, water added to the reaction may increase conversion rate and thus the yield of formed fatty acid ester.

DETAILED DESCRIPTION OF THE INVENTION

The invention relates to a method of transesterifying a fatty acid triglyceride with a $C_{1-30}$ aliphatic alcohol, the method comprising step (A):

(A) heating the fatty acid triglyceride with the $C_{1-30}$ aliphatic alcohol in the presence of an acid;
wherein
the acid is selected from the group consisting of a sulfonic acid, a disulfonic acid, a hydroxycarboxylic acid, and a mixture thereof;
the molar ratio of fatty acid triglyceride to aliphatic alcohol is less than 1:6; and
the heating is in a temperature range of from 20 to less than 100° C.

The term "fatty acid" as used herein encompasses carboxylic acids comprising from 10 to 30 carbon atoms.

The term "fatty acid triglyceride" as used herein encompasses a natural oil such as vegetable oils such as rapeseed oil, soybean oil, palm oils or other vegetable oils. The term also encompasses used cooking oils, e.g. from food production, and animal fats.

Preferably, vegetable oils are used in the method according to the invention.

Particularly preferred are vegetable oils such as rapeseed oil and soybean oil.

In a more particularly preferred embodiment, the triglyceride used in step (A) is used oil or used fat, i.e. a waste grease. Thus, in a particularly preferred embodiment, the fatty acid triglyceride is or comprises a waste grease.

The use of animal oils or animal fats is likewise preferred.

In one embodiment, the triglyceride may contain free fatty acids in an amount up 10% by weight, preferably not more than 8% by weight, more preferably not more than 5% by weight based on the total amount of the fatty acid triglyceride.

In another embodiment, if the triglyceride contains higher amounts of free fatty acids, these acids are preferably subjected to a pre-esterification prior to a transesterification according to the method of the invention.

According to the invention, the transesterification is performed with a $C_{1-30}$ aliphatic alcohol.

The term "aliphatic" comprises unbranched as well as branched aliphatic.

The hydroxyl group of the $C_{1-30}$ aliphatic alcohol may be a primary or a secondary hydroxyl group, preferably a primary hydroxyl group.

In one aspect, according to a preferred embodiment, the $C_{1-30}$ aliphatic alcohol is a $C_{1-5}$ aliphatic alcohol, preferably a $C_{1-5}$ aliphatic alcohol, or a $C_{1-2}$ aliphatic alcohol.

Accordingly, in one embodiment, the method provides a fatty acid esterified with a $C_{1-5}$ aliphatic alcohol. Such fatty acid esters may be used as biodiesel.

Preferably, the $C_{1-5}$ aliphatic alcohol is selected from methanol, ethanol, an isopropanol and a butanol and a mixture of two or more thereof. If an isopropanol or a butanol is used in step (A), it is preferred to use n-propanol or n-butanol.

In one embodiment, the $C_{1-5}$ aliphatic alcohol is methanol.

In another preferred embodiment, the $C_{1-5}$ aliphatic alcohol is ethanol or comprises ethanol.

In another preferred embodiment, said ethanol is bioethanol. Bioethanol may be produced by fermentation of suitable sugars such as sucrose stemming from sugar cane. In said embodiment, the method according to the invention provides a fatty acid ethyl ester which is completely made from renewable resources.

In another embodiment, the $C_{1-5}$ aliphatic alcohol is a mixture of ethanol and methanol.

In another aspect, according to another preferred embodiment, the $C_{1-30}$ aliphatic alcohol is a $C_{6-30}$ aliphatic alcohol, preferably a $C_{10-26}$ aliphatic alcohol.

Accordingly, in this embodiment, the method provides for a fatty acid esterified with the $C_{6-30}$ aliphatic alcohol. Such fatty acid esters may have wax properties and may thus be used as waxes.

Suitable $C_{6-30}$ aliphatic alcohols are preferably hexyl alcohol, octyl alcohol, decyl alcohol, lauryl alcohol, cetyl alcohol, stearyl alcohol, ceryl alcohol, myristyl alcohol, and mixtures of two or more thereof.

According to the invention, step (A) requires the presence of an acid. The acid is selected from the group consisting of a sulfonic acid, a disulfonic acid, a hydroxycarboxylic acid, and a mixture thereof.

The term "acid is selected from the group consisting of a sulfonic acid, a disulfonic acid, a hydroxycarboxylic acid, and a mixture thereof" does not exclude the presence of further acids. However, a sulfonic acid or a disulfonic acid or a hydroxycarboxylic acid, or a mixture thereof has to be mandatorily present in the process according to the invention.

The term "sulfonic acid" as used herein encompasses aliphatic sulfonic acids, optionally substituted, and aromatic sulfonic acids, optionally substituted.

Aliphatic sulfonic acids preferably are sulfonic acids having up to 8 carbon atoms in the aliphatic residue.

Preferred aliphatic sulfonic acids are methanesulfonic acid, n-butanesulfonic acid and n-octanesulfonic acid.

Such acids may also be substituted with one or more halogen atoms such as fluorine.

Accordingly, further preferred is in step (A) the use of trifluoromethanesulfonic acid, perfluoro-n-butanesulfonic acid, and perfluoro-n-octanesulfonic acid.

Aromatic sulfonic acids preferably are benzenesulfonic acids, optionally substituted.

Preferred benzenesulfonic acids are selected from benzenesulfonic acid as such, toluenesulfonic acid, and p-trifluoromethylbenzenesulfonic acid.

In another embodiment, the acid is a disulfonic acid.

The disulfonic acid may be an aliphatic or an aromatic disulfonic acid.

A preferred aliphatic disulfonic acid is ethane-1,2-disulfonic acid.

In another embodiment, the acid is a hydroxycarboxylic acid.

The hydroxycarboxylic acid may be an aliphatic or an aromatic hydroxycarboxylic acid, optionally substituted, respectively.

Optionally substituted aliphatic hydroxycarboxylic acids are selected from the group consisting of: glycolic acid, lactic acid, mevalonic acid, malic acid, citric acid, isocitric acid, mandelic acid, tartronic acid, and tartric acid.

Aromatic carboxylic acids are preferably selected from salicylic acid and p-hydroxybenzoic acid.

In a preferred embodiment, one or more sulfonic acid(s) is/are used in step (A).

In a further preferred embodiment, one or more disulfonic acid(s) is/are used in step (A).

In a further preferred embodiment, one or more hydroxycarboxylic acid(s) is/are used in step (A).

In a particularly preferred embodiment, a mixture of one or more sulfonic acid(s) and one or more disulfonic acids is used in step (A).

In a further particularly preferred embodiment, a mixture of one or more sulfonic acid(s) with one or more hydroxycarboxylic acid(s) is used in step (A).

In still another particularly preferred embodiment, a mixture of one or more sulfonic acid(s) with one or more disulfonic acids and one or more hydroxycarboxylic acid(s) is used in step (A).

In yet another particularly preferred embodiment, a mixture of one or more disulfonic acids with one or more hydroxycarboxylic acid(s) is used in step (A).

The specified acids may be used in the method according to the invention in diluted form, preferably diluted with water, as long as the total water content in the mixture used in step (A) does not hamper the transesterification.

In a preferred embodiment, the acid is or comprises methanesulfonic acid.

Preferably, the acid or acids used in the transesterification are used in an amount of from 0.01 to 5 weight-% based on the total amount of the fatty acid triglyceride, preferably from 0.1 to 3 weight-%, more preferably 0.5 to 2 weight-%.

According to the invention, the molar ratio of fatty acid triglyceride to aliphatic alcohol is less than 1:6, i.e. less than 0.167.

In further preferred embodiments, the molar ratio of fatty acid triglyceride to aliphatic alcohol is less than 1:6 but at least 1:8 or at least 1:10 or at least 1:12 or at least 1:14 or at least 1:16 or at least 1:18 or at least 1:20 or at least 1:22 or at least 1:24 or at least 1:26 or at least 1:28.

Although the lower limit of the molar ratio is not particularly limited, it is preferred that the molar ratio is not less than 1:40 in order to achieve a reasonable space/time yield.

In a preferred embodiment, the molar ratio of fatty acid triglyceride to aliphatic alcohol ranges from less than 1:6 to 1:40 or from 1:8 to 1:30 or from 1:10 to 1:28 or from 1:12 to 1:28 or from 1:14 to 1:26.

According to the invention, the heating in step (A) is in a temperature range of from 20° C. to less than 100° C.

In a preferred embodiment, the heating is in a temperature range of from 40 to less than 100° C., preferably from 50 to 90° C.

The reaction according to step (A) may be performed unpressurized or pressurized, preferably unpressurized.

In one embodiment, if the $C_{1-30}$ alcohol used in step (A) has a boiling point below 100° C., the heating in step (A) is carried out such that the temperature is kept below the boiling point of the alcohol. This prevents the alcohol from distilling off. This provides for an advantageous unpressurized reaction.

In another embodiment, if the $C_{1-30}$ alcohol used in step (A) has a boiling point below 100° C., the heating in step (A) is carried out such that the temperature is kept at or above the boiling point of the alcohol, wherein step (A) is carried out pressurized in order to prevent alcohol from distilling off. Accordingly, in this embodiment, step (A) is performed in a sealed reactor.

In a preferred embodiment, the reaction according to step (A) is carried out in presence of water.

The inventors have surprisingly discovered that very pure starting materials in terms of water content may slow down the reaction rate and/or even result in a non-acceptable rather low conversion of triglyceride to desired ester. On the other hand, a water content too high also slows down the reaction rate and/or results in a low conversion of triglyceride to ester or even prevents transesterification.

In a preferred embodiment, the water content of the mixture of ingredients used in step (A) is controlled such to range from 0.01 weight-% to 2.0 weight-% based on the weight of the fatty acid triglyceride (=100 weight-%), preferably 0.01 to 0.5 weight-%, more preferably 0.02 to 0.3 weight-%.

The term "controlled" means that water may be removed when exceeding the upper limit of 2.0 weight-% or may be added when falling below the lower limit of 0.01 weight-%.

The water content may be determined by Karl-Fischer-titration.

The reaction according to step (A) may be carried out by simply stirring a mixture of triglyceride, alcohol and acid using the desired temperature.

As soon as the degree of transesterification has reached the desired value, which may be e.g. controlled by gas chromatographic determination, the reaction is terminated, and the mixture formed in step (A) preferably is cooled down to ambient temperature.

Typically, a phase separation may be observed, resulting in a lower phase predominantly containing glycerol and the acid such as sulfonic acid, and an upper phase predominantly comprising the formed fatty acid ester and excess $C_{1-30}$ alcohol.

A particular advantage of the method according to the invention is that phase separation typically is extraordinarily fast.

The phases are separated, wherein the upper phase preferably is subjected to distillation in order to remove excess alcohol. If necessary, the fatty acid ester fraction may be washed with water in order to remove catalyst.

The fatty acid ester may be subjected to rectification to further purify same, if desired.

Accordingly, in one embodiment, the method comprises step (B):
(B) separating the fatty acid ester formed in step (A) from glycerol and excess $C_{1-30}$ aliphatic alcohol.

In one embodiment, step (B) comprises steps (B1), (B2) and (B3):
(B1) subjecting the mixture formed in step (A) to phase separation in order to obtain a phase comprising glycerol and a phase comprising the ester of the fatty acid with the $C_{1-30}$ alcohol and excess $C_{1-30}$ alcohol;
(B2) separating glycerol from the mixture of fatty acid ester and excess $C_{1-30}$ alcohol:
(B3) subjecting the mixture formed in step (B2) to distillation.

The method according to the invention may be performed discontinuously or continuously.

In one embodiment, the reaction according to step (A) is carried out discontinuously.

In one embodiment of the discontinuous method, the starting materials are fed to a suitable vessel, wherein the transesterification, the termination of the reaction and the processing is performed as described above.

In another embodiment, the reaction is performed in a continuous manner.

In a preferred embodiment of the continuous method, step (A) comprises steps (A1) and (A2):
(A1) feeding a mixture of the fatty acid triglyceride, the alcohol and the acid to a reaction zone; and
(A2) withdrawing at least a portion of the reaction mixture obtained in step (A) from the reaction zone;
wherein step (A1) and step (A2) are performed continuously.

The term "continuously" means that steps (A1) and (A2) are carried out simultaneously.

In one embodiment, a portion of said portion withdrawn in step (A2) is fed back to the reaction zone according to step (A1) and another portion of said portion withdrawn in step (A2) is separated according to step (B).

In one embodiment, in particular when the method is performed with a $C_{1-5}$ alcohol, after transesterification, the amount of monoglycerides contained in the formed fatty acid ester is below 0.1% by weight, preferably below 0.05% by weight such as below 0.02% by weight, based on the total amount of the fatty acid ester, determined according to DIN EN 14105.

In one embodiment, the thus formed fatty acid ester has biodiesel quality determined according to DIN EN 14214.

According to another aspect, the molar ratio of fatty acid triglyceride to aliphatic alcohol is above 1:6.

In preferred embodiments, the molar ratio of fatty acid triglyceride to aliphatic alcohol is at least 1:6 or at least 1:8 or at least 1:10 or at least 1:12 or at least 1:14 or at least 1:16 or at least 1:18 or at least 1:20 or at least 1:22 or at least 1:24 or at least 1:26 or at least 1:28.

In a preferred embodiment of this aspect, the molar ratio of fatty acid triglyceride to aliphatic alcohol ranges from above 1:6 to 1:40 or from 1:8 to 1:30 or from 1:10 to 1:28 or from 1:12 to 1:28 or from 1:14 to 1:26.

In another aspect, the invention relates to a method of enhancing and/or improving the conversion of a fatty acid triglyceride in a transesterification reaction with a $C_{1-30}$ aliphatic alcohol, the method comprising:

controlling the water content of the mixture of ingredients used in the transesterification reaction such to range from 0.01 weight-% to 2.0 weight-% based on the weight of the fatty acid triglyceride (=100 weight-%), preferably 0.01 to 0.5 weight-%, more preferably 0.02 to 0.3 weight-%.

In one embodiment, the transesterification comprises step (A):

(A) heating the fatty acid triglyceride with the $C_{1-30}$ aliphatic alcohol in the presence of an acid; wherein the acid is selected from the group consisting of a sulfonic acid, a disulfonic acid, a hydroxycarboxylic acid, and a mixture thereof; and the molar ratio of fatty acid triglyceride to aliphatic alcohol is less than 1:6; and the heating in step (A) is in a temperature range of from 20 to less than 100° C.

In another embodiment, the transesterification comprises step (A):

(A) heating the fatty acid triglyceride with the $C_{1-30}$ aliphatic alcohol in the presence of an acid; wherein the acid is selected from the group consisting of a sulfonic acid, a disulfonic acid, a hydroxycarboxylic acid, and a mixture thereof; and the molar ratio of fatty acid triglyceride to aliphatic alcohol is above 1:6; and the heating in step (A) is in a temperature range of from 20 to less than 100° C.

In one embodiment, water is removed when the water content exceeds 2.0 weight-% based on the weight of the fatty acid triglyceride or is added when the water content is below 0.01 weight-% based on the weight of the fatty acid triglyceride (=100% by weight).

EXAMPLES

Example 1

60 g of anhydrous rapeseed oil, 20 g dry ethanol, 0.8 ml methane sulfonic acid and water were heated unpressurized for 48 hours at a temperature of 75° C. Then the reaction was terminated, and the yield of the formed fatty acid ethyl ester was determined gas chromatographically. The results are shown in the following table in dependence of the amount of water added to the reaction mixture:

| Water | 0 ml | 10 µl | 0.1 ml | 1 ml | 2 ml | 4 ml |
|---|---|---|---|---|---|---|
| Yield [%] | 85 | 94 | 97.4 | 84 | 24 | 6 |

Example 2

120 g rapeseed oil, 40 g ethanol, 1.6 ml methanesulfonic acid and 0.2 ml water were heated unpressurized for 48 hours at a temperature of 75° C. Then the reaction was terminated. After cooling down to ambient temperature, the formed mixture was transferred to a separating funnel. After separation of the phases, the lower phase was separated off. The upper phase was transferred to a rotary evaporator and ethanol was distilled off. The residue contained about 97% fatty acid ethyl ester as determined by gas chromatography.

Example 3

Example 2 was repeated at a temperature of 95° C. under a pressure of 2 bar. The residue contained about 96% fatty acid ethyl ester as determined by gas chromatography.

Example 4

10 t of crude palm oil (free fatty acid 5% by weight, water 0.2% by weight), 140 kg methanesulfonic acid and 3 t methanol where heated up pressurized in a stainless steel reactor to 95° C. and a pressure of 2 bar. After 2 h stirred reaction time, depressurizing followed. After 30 min waiting time, the formed acid glycerol phase was pumped off. Then the excess methanol was evaporated under vacuum of 350 mbar. The residue had an ester content of 97%, monoglycerid <0.25%, diglycerides <0.15% and triglyceride <0.15%, as determined by gas chromatographic analysis.

Example 5

The procedure of Example 5 was repeated with 10 t soap stock splitted fatty acids containing 3000 ppm P, 55% free fatty acids, 40% triglycerides, 1% water and approximately 3% unsaponifiable content, 3 t methanol and 180 kg methanesulfonic acid. The reaction time was extended to 3 h. The obtained yield was 95% and the phosphorus content was less than 5 ppm.

Example 6

A mixture of 10 t used cooking oil, 3 t methanol and 200 kg methanesulfonic acid was heated up unpressurized to 75° C. for 5 h. The evaporated methanol was condensed and fed back to the process. After separation of the glycerol phase, the methanol was evaporated under vacuum of 350 mbar. The yield of transesterification product was 96%.

The invention claimed is:

1. A method of transesterifying a fatty acid triglyceride with a $C_{1-30}$ aliphatic alcohol, the method comprising step (A):

(A) heating the fatty acid triglyceride with the $C_{1-30}$ aliphatic alcohol in the presence of an acid;

wherein the acid is selected from the group consisting of a sulfonic acid, a disulfonic acid, a hydroxycarboxylic acid, and a mixture thereof;

the molar ratio of fatty acid triglyceride to aliphatic alcohol is less than 1:6;

the heating in step (A) is in a temperature range of from 20 to less than 100° C.;

the reaction according to step (A) is carried out in presence of water, wherein said water is controlled such to range from 0.01 weight-% to 2.0 weight-% based on the weight of the fatty acid triglyceride (=100 weight-%);

the sulfonic acid is selected from methanesulfonic acid, butanesulfonic acid, octanesulfonic acid, trifluoromethanesulfonic acid, perfluorobutanesulfonic acid, perfluorooctanesulfonic acid, benzenesulfonic acid, toluenesulfonic acid, p-trifluoromethylbenzene sulfonic acid, and a mixture of two or more thereof;

the disulfonic acid is or comprises ethane-1,2-disulfonic acid; and the hydroxycarboxylic acid is selected from malic acid, citric acid, isocitric acid, glycolic acid, mandelic acid, lactic acid, tartronic acid, tartric acid, mevalonic acid, salicylic acid, p-hydroxybenzoic acid, and a mixture of two or more thereof;

the method further comprising:

terminating the reaction and cooling the reaction mixture to ambient temperature to obtain a phase separation resulting in a lower phase predominantly containing glycerol and the acid, and an upper phase predominantly comprising the formed fatty acid ester and excess $C_{1-30}$ alcohol.

2. The method of claim 1, wherein the triglyceride is selected from the group consisting of natural oils, animal fats and waste grease; or
wherein the fatty acid triglyceride is or comprises a waste grease.

3. The method of claim 1, wherein the $C_{1-30}$ aliphatic alcohol is a $C_{1-5}$ aliphatic alcohol.

4. The method of claim 1, wherein the alcohol is selected from methanol, ethanol, an isopropanol and a butanol; or
wherein the alcohol is or comprises ethanol; or
wherein the alcohol is a mixture of methanol and ethanol.

5. The method of claim 1, wherein the $C_{1-30}$ aliphatic alcohol is a $C_{6-30}$ aliphatic alcohol.

6. The method of claim 1, wherein the acid is or comprises methanesulfonic acid.

7. The method of claim 1, wherein the molar ratio of fatty acid triglyceride to aliphatic alcohol is at least 1:8 or at least 1:10 or at least 1:12; or
the molar ratio of fatty acid triglyceride to aliphatic alcohol ranges from less than 1:6 to 1:40 or from 1:8 to 1:30 or from 1:10 to 1:28 or from 1:12 to 1:28 or from 1:14 to 1:26.

8. The method of claim 1, wherein the heating is in a temperature range of from 40 to 100° C. or 50 to 90° C.

9. The method of claim 1, wherein, if the $C_{1-30}$ alcohol used in step (A) has a boiling point below 100° C., the heating in step (A) is carried out such that the temperature is kept below the boiling point of the alcohol in order to prevent alcohol from distilling off and allowing performing step (A) unpressurized.

10. The method of claim 1, wherein, if the $C_{1-30}$ alcohol used in step (A) has a boiling point below 100° C., the heating in step (A) is carried out such that the temperature is kept at or above the boiling point of the alcohol, and wherein step (A) is carried out pressurized in order to prevent alcohol from distilling off.

11. The method of claim 1, wherein water is removed when the water content of the ingredients defined in step (A) exceeds 2.0 weight-% based on the weight of the fatty acid triglyceride or water is added when the water content of the ingredients defined in step (A) is below 0.01 weight-% based on the weight of the fatty acid triglyceride.

12. The method of claim 1, further comprising step (B):
(B) separating the fatty acid ester formed in step (A) from glycerol and excess $C_{1-30}$ aliphatic alcohol.

13. The method of claim 1, wherein step (A) comprises steps (A1) and (A2):
(A1) feeding a mixture of the fatty acid triglyceride, the alcohol and the acid to a reaction zone; and
(A2) withdrawing at least a portion of the reaction mixture obtained in step (A) from the reaction zone;
wherein step (A1) and step (A2) are performed simultaneously.

14. The method of claim 13, wherein a portion of said portion withdrawn in step (A2) is fed back to step (A1) and another portion of said portion withdrawn in step (A2) is separated according to step (B):
(B) separating the fatty acid ester formed in step (A) from glycerol and excess $C_{1-30}$ aliphatic alcohol.

* * * * *